US011575440B2

(12) United States Patent
Bisht et al.

(10) Patent No.: US 11,575,440 B2
(45) Date of Patent: Feb. 7, 2023

(54) COMPUTING VIABLE PATHS THROUGH AN OPTICAL NETWORK

(71) Applicant: Ciena Corporation, Hanover, MD (US)

(72) Inventors: Seemant Bisht, Gurgaon (IN); Sujit Kumar, Gurgaon (IN); Mohit Chhillar, Gurgaon (IN); Dominic Richens, Perth (CA)

(73) Assignee: Ciena Corporation, Hanover, MD (US)

( * ) Notice: Subject to any disclaimer, the term of this patent is extended or adjusted under 35 U.S.C. 154(b) by 203 days.

(21) Appl. No.: 17/099,927

(22) Filed: Nov. 17, 2020

(65) Prior Publication Data

US 2022/0109502 A1    Apr. 7, 2022

(30) Foreign Application Priority Data

Oct. 3, 2020    (IN) .............................. 202011043058

(51) Int. Cl.
*H04B 10/27*    (2013.01)
*H04B 10/03*    (2013.01)
*H04Q 11/00*    (2006.01)

(52) U.S. Cl.
CPC ............. *H04B 10/27* (2013.01); *H04B 10/03* (2013.01); *H04Q 11/0001* (2013.01)

(58) Field of Classification Search
CPC ..... H04B 10/27; H04B 10/03; H04Q 11/0001
See application file for complete search history.

(56) References Cited

U.S. PATENT DOCUMENTS

| 8,682,160 B2 | 3/2014 | Prakash et al. |
| 8,818,198 B2 | 8/2014 | Trnkus et al. |
| 8,854,955 B2 | 10/2014 | Prakash et al. |
| 9,054,831 B2 | 6/2015 | Prakash et al. |
| 9,118,421 B2 | 8/2015 | Swinkels et al. |
| 9,172,658 B2 | 10/2015 | Kakkar et al. |
| 9,236,953 B2 | 1/2016 | Chhillar et al. |
| 9,407,359 B2 | 8/2016 | Swinkels et al. |

(Continued)

OTHER PUBLICATIONS

E. Mannie, "Generalized Multi-Protocol Label Switching (GMPLS) Architecture," Network Working Group, Category: Standards Track, The Internet Society, Oct. 2004, pp. 1-69.

*Primary Examiner* — Brenda H Pham
(74) *Attorney, Agent, or Firm* — BarattaIP PLLC; Lawrence A. Baratta, Jr.

(57) ABSTRACT

Path computation systems and methods are provided herein. According to one embodiment, a method includes obtaining topological information representing a topology of at least a portion of a network. The topological information includes one or more nodes and one or more links, each link configured to connect a node with a neighboring node. Each node includes a plurality of internal components and a plurality of connections configured to interconnect the internal components. The method further includes running path computation through the topological information to determine a plurality of paths from a first internal component to a second internal component. Also, the method includes applying elimination rules during the path computation to filter out one or more paths detected as being invalid. The elimination rules are based on one or more predetermined path sequences that include at least two hops involving an unviable sequence of specific types of internal components.

20 Claims, 5 Drawing Sheets

(56) References Cited

U.S. PATENT DOCUMENTS

| | | | |
|---|---|---|---|
| 9,485,550 B2 | 11/2016 | Chhillar et al. | |
| 9,485,551 B2 | 11/2016 | Prakash et al. | |
| 9,538,264 B2 | 1/2017 | Surek et al. | |
| 9,628,172 B2 | 4/2017 | Prakash et al. | |
| 9,800,522 B2 | 10/2017 | Chhillar et al. | |
| 9,985,724 B2 | 5/2018 | Prakash et al. | |
| 10,038,495 B2 | 7/2018 | Prakash et al. | |
| 10,097,306 B1 | 10/2018 | Chhillar et al. | |
| 10,110,438 B2 | 10/2018 | Prakash et al. | |
| 10,187,144 B2 | 1/2019 | Prakash et al. | |
| 10,187,152 B2 | 1/2019 | Prakash et al. | |
| 10,237,011 B2 | 3/2019 | Al Sayeed et al. | |
| 10,411,806 B2 | 9/2019 | Prakash et al. | |
| 10,455,300 B2 | 10/2019 | Swinkels et al. | |
| 10,536,216 B1 | 1/2020 | Chhillar et al. | |
| 10,560,212 B2 | 2/2020 | Al Sayeed et al. | |
| 2013/0315580 A1* | 11/2013 | Boertjes | H04J 14/0204 398/5 |

\* cited by examiner

COMPUTING VIABLE PATHS THROUGH AN OPTICAL NETWORK

TECHNICAL FIELD

The present disclosure generally relates to optical networks. More particularly, the present disclosure relates to discarding invalid optical paths through an optical network during path computation.

BACKGROUND

To create a communications network, nodes are installed at multiple sites and links are run between the nodes for interconnectivity therebetween. With this topology, signals can be communicated from a source node to a destination node, where the source and destination nodes can be any nodes in the network. In some cases, the source and destination may be directly connected with each other via a single link, while, in other cases, the path from the source to the destination may require the use of multiple links via one or more intermediate nodes.

Path computation is often used to determine a number of different paths from a source to a destination, where each path might include different combinations of links and intermediate nodes. In path computation, it is usually desirable to determine a shortest path or a path that has the lowest "cost." For instance, a common process for performing path computation is "Dijkstra's algorithm," which may be referred to as a Shortest Path First (SPF) algorithm for finding the shortest path between nodes.

In operation, Dijkstra's algorithm includes creating a graph that represents the topology of a network. The algorithm "walks" through the graph from a single node that is designated as the source node to find multiple paths from that node to other nodes in the graph. In particular, the algorithm looks for the shortest paths to the different nodes to generate a shortest path tree. In one example, Dijkstra's algorithm may be used for determining the fastest driving route from one city to another by considering different roads. In the environment of communications networks, however, Dijkstra's algorithm is typically used to find the shortest signal transmission route between a source node and other nodes, whereby the algorithm may be utilized in various network routing protocols (e.g., Intermediate System to Intermediate System (IS-IS), Open Shortest Path First (OSPF), etc.).

Dijkstra's algorithm typically involves a graph that represents the topology of a network, which includes nodes and interconnecting links. The nodes are usually referred to as vertices and the links are usually referred to as edges. The graph also includes a "cost" associated with each link, where the cost may be a distance, an actual monetary cost, time, or any other parameter of concern. By "walking" through the graph, Dijkstra's algorithm is configured to consider various paths while adding up the total costs along each tentative path. This is done while eliminating paths that are determined to be more costly than preferred paths to each intermediate node. The process is repeated until a best path (with the lowest cost) is found. The best path might be the shortest path in terms of distance.

This algorithm along with other path computation algorithms are typically configured to allow the consideration of any path traversing across links between nodes of a network. However, typical path computation does not consider the internal components within a node itself, but instead simply treats each node as a single entity. With respect to optical networks, however, some nodes (e.g., network elements) are configured with a plurality of internal components, and more particularly may include components where light can only travel in one direction. For example, an optical multiplexer receives light at a common input port and sends the light along one or more output ports. Conventional path computation does not normally attempt to compute paths on the level of granularity of the internal components of each of the nodes. Therefore, there is a need in the field of path computation to consider various constraints that would prevent communication along invalid paths in an optical network.

BRIEF SUMMARY

The present disclosure is directed to path computation for computing paths between a source node and a destination node within a network, such as an optical network. In addition to the links that interconnect the nodes, the embodiments of the present disclosure are also configured to analyze the internal components of the nodes to determine paths through the connections between these internal components. However, since path computation within a single node may involve multiple paths that are invalid or unviable, the systems and methods of the present disclosure are configured to eliminate these invalid paths in order to make path computation more efficient. Invalid paths are eliminated when it is determined, by looking back at two previous consecutive hops in a partial path, that the types of internal components involved with these two previous consecutive hops follow one of a number of invalid sequences.

According to one implementation, a system may include a network interface connected to a network, a processing device in communication with the network interface, and a memory device in communication with the processing device. The memory device may be configured to store a computer program having instructions that, when executed, enables the processing device to obtain topological information representing a topology of at least a portion of the network. The topological information may include one or more nodes and one or more links, where each link is configured to connect one of the one or more nodes with a neighboring node. Each node may include a plurality of internal components and a plurality of connections configured to interconnect the internal components. The instructions also enable the processing device to run path computation through the topological information to determine a plurality of paths from a first internal component to a second internal component. Also, the instructions enable the processing device to apply elimination rules during the path computation to filter out one or more paths detected as being invalid. The elimination rules are based on one or more predetermined path sequences that include at least two hops involving an unviable sequence of specific types of internal components.

According to another implementation, a non-transitory computer-readable medium may be configured to store computer logic having instructions that, when executed, cause one or more processing devices to obtain topological information representing a topology of at least a portion of a network. The topological information may include one or more nodes and one or more links, each link configured to connect one of the one or more nodes with a neighboring node. Each node may include a plurality of internal components and a plurality of connections configured to interconnect the internal components. The instructions further cause the one or more processing devices to run path computation through the topological information to determine a plurality of paths from a first internal component to a second internal component. The instructions also allow the one or more processing devices to apply elimination rules during the path computation to filter out one or more paths detected as being invalid, wherein the elimination rules are based on one or more predetermined path sequences that include at least two hops involving an unviable sequence of specific types of internal components.

According to yet another implementation, a method may include the step of obtaining topological information representing a topology of at least a portion of a network, where the topological information may include one or more nodes and one or more links. Each link may be configured to connect one of the one or more nodes with a neighboring node, and each node may include a plurality of internal components and a plurality of connections configured to interconnect the internal components. The method may also include the step of running path computation through the topological information to determine a plurality of paths from a first internal component to a second internal component. In addition, the method may include applying elimination rules during the path computation to filter out one or more paths detected as being invalid. The elimination rules may be based on one or more predetermined path sequences that include at least two hops involving an unviable sequence of specific types of internal components.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
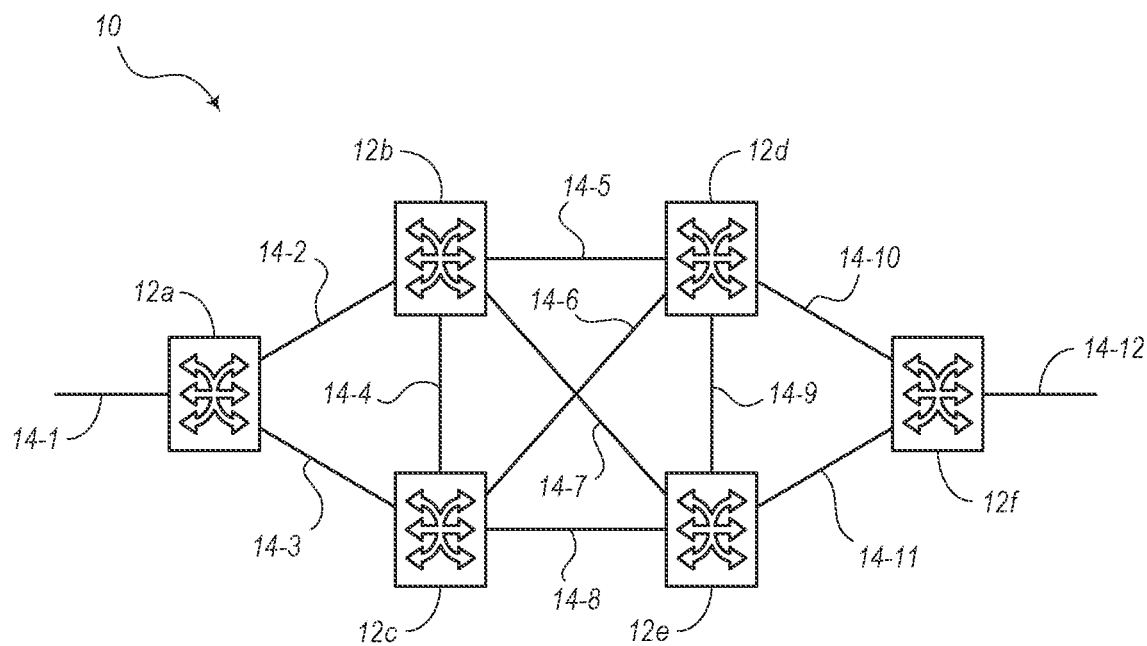
FIG. 1 is a diagram illustrating a network having a combination of photonic and electrical components, according to various embodiments of the present disclosure.

The present disclosure relates to path computation systems and methods for detecting paths through a network, such as an optical or photonic network. According to the present disclosure, paths are not only computed from node-to-node but are also computed within the internal components of each of the nodes themselves. Since an optical node may have different types of optical components and since these component may only realistically allow communication in one direction (e.g., from a common input port of an optical multiplexer to one or more of the output ports of the optical multiplexer), path computation as described in the present disclosure involves eliminating invalid paths, such as paths that are unviable in an optical system.

One of the shortcomings of the conventional path computation algorithms is that, even though invalid sequences can be structured as a list or a tree, as the number or length of possible invalid sequences grows, more time is required to filter partial paths. At some point, however, it becomes more efficient to use a port pair filtering per node type. Conventional algorithms treat network elements as nodes, but does not treat hardware as an edge. The embodiments of the present disclosure are configured to overcome these deficiencies.

Similar to the path computation process of Dijkstra, the embodiments of the present disclosure are able to obtain information regarding the topology of the network being analyzed. However, instead of merely computing paths along links interconnecting a plurality of nodes, the embodiments of the present disclosure are configured to perform a deeper analysis in which the internal paths within each of the nodes themselves are also analyzed. Therefore, multiple paths from one internal component of one node to another internal component of another node can be analyzed. Since path computation of the present disclosure involve many more paths than a typical Dijkstra analysis, it has been recognized that such a large number of paths may be an obstacle for performing path computation in a timely manner. Thus, it has been found, as described with respect to the embodiments disclosed herein, that the number of paths can be reduced to eliminate those paths that are not valid (e.g., which are physically impossible or unviable given the specific types of optical components involved).

During the path computation of the present disclosure, specific elimination rules are checked to determine if a partial path being analyzed is following a specific sequence that is not allowed. When these paths are determined to be invalid, they can be filtered out of a tentative list (e.g., also referred to as a priority queue or priority heap). When these paths are filtered out, any additional paths that depend on those filtered out paths (or include the same invalid sequence of the filtered out paths) can be eliminated as well. By filtering out the invalid paths, the path computation can be run more quickly and efficiently.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

FIG. 1 is a diagram illustrating an embodiment of a network 10 for which different paths through the network 10 are analyzed. In some embodiments, the network 10 may include a combination of photonic and electrical components. Path computation systems and methods in mixed photonic and digital mesh networks may define additional constraints required for paths in photonic network. The path computation systems and methods may include shortest path algorithms that use constraints to compute paths in the photonic network to deliver optimal paths which follow wavelength continuity constraints. Some constraints defined for the photonic network may fall into two broad categories—link constraints and nodal constraints. Routing in the electrical domain assumes that each node supports non-blocking switching, hence the computations for the digital network only use link constraints. In the photonic domain, however, the link constraints are extended to include not only resource availability but also resource capabilities as described herein. The nodal constraints originate from the fact that the photonic nodes could have partial connectivity towards the fabric between various egress switching points.

The network 10 of FIG. 1 may include a mixed photonic and digital mesh network. The network 10 includes a plurality of network elements 12a, 12b, 12c, 12d, 12e, 12f interconnected therebetween via links 14-1, 14-2, . . . , 14-12. As described herein, the photonic portion of the network 10 includes an optical layer over the links 14, such as Wavelength Division Multiplexing (WDM), Dense WDM (DWDM), etc. The digital portion of the network 10 includes a protocol over the photonic links (e.g., Optical Transport Network (OTN), Synchronous Optical Network (SONET), Synchronous Digital Hierarchy (SDH), Ethernet, or any other Time Division Multiplexing (TDM) protocol). In an exemplary embodiment, the network elements 12 may include a nodal device that can consolidate the functionality of a Multi-Service Provisioning Platform (MSPP), Digital Cross Connect (DCS), Ethernet and OTN switch, DWDM platform, etc. into a single, high-capacity intelligent switching system providing Layer 0, 1, and 2 consolidation. In another embodiment, the network elements 12 may include any of an OTN/SONET/SDH add/drop multiplexer, a MSPP, a DCS, an optical cross-connect, a WDM/DWDM terminal, a switch, a router, and the like.

The network 10 may also include a control plane operating thereon between the network elements 12 and over the links 14. For example, each of the network elements 12 may include a controller that is responsible for all control plane processing. Generally, the control plane includes software, processes, algorithms, etc. that control configurable features of the network 10 (e.g., automating discovery of the network elements 12, capacity on the links 14, port availability on the network elements 12, connectivity between ports), dissemination of topology and bandwidth information between the network elements, calculation and creation of paths for connections, network level protection and restoration, etc. In some embodiments, the control plane may utilize Automatically Switched Optical Network (ASON) as defined in G.8080/Y.1304, architectures for the Automatically Switched Optical Network (ASON), and the like. In another exemplary embodiment, the control plane may utilize Generalized Multi-Protocol Label Switching (GMPLS) Architecture as defined in Request for Comments: 3945 (October 2004), the contents of which are herein incorporated by reference, and the like. In yet other embodiments, the control plane may utilize Optical Signaling and Routing Protocol (OSRP), which is an optical routing protocol similar to Private Network-to-Network Interface (PNNI), Multiprotocol Label Switching (MPLS), etc. Those of ordinary skill in the art will recognize the network and the control plane may utilize any suitable type of control plane for controlling the network elements 12 and establishing connections therebetween.

Figure 2:
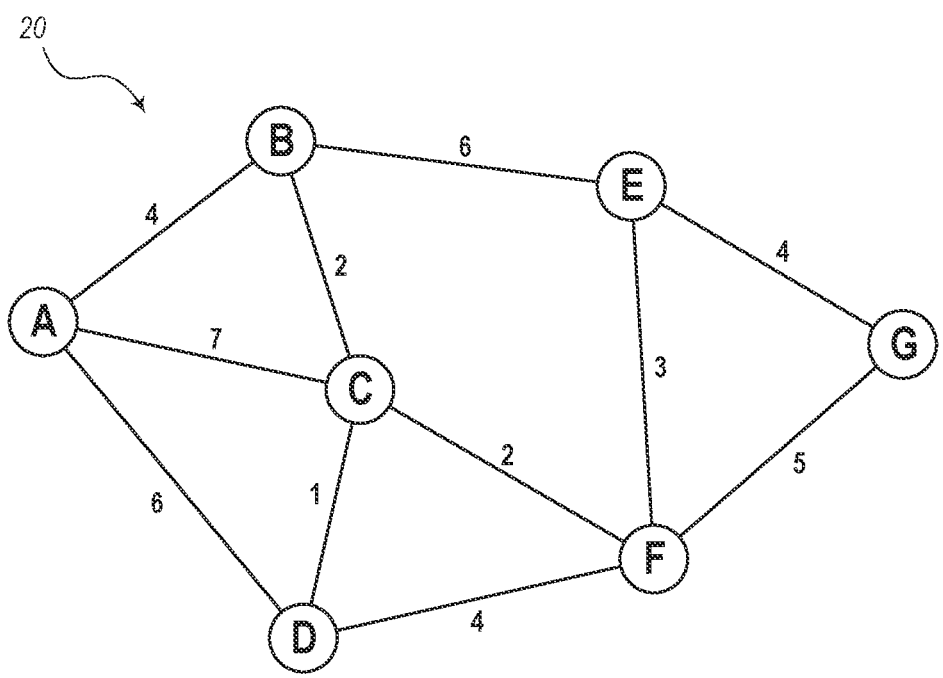
FIG. 2 is a diagram illustrating a path computation graph for representing a network of which path computation is performed, according to various embodiments of the present disclosure.

FIG. 2 is a diagram illustrating a path computation graph 20 for representing another network (or a portion of a network) of which path computation is performed. The path computation graph 20 shows a number of nodes (i.e., nodes A, B, C, D, E, F, and G) of the network and a plurality of links connecting each of the nodes with one or more neighboring nodes. According to this example, node A includes three degrees for connecting to nodes B, C, D via three different links. In this example, each of nodes B, D, and E also include three degrees; nodes C and F each include four degrees; and node G include two degrees. Also shown in the path computation graph 20 of FIG. 2 is a "cost" value or "weight" attributed to each of the links. For example, the cost or weight for traversing from node A to node B is has a value of 4. The costs may represent a distance, time, actual monetary costs, etc. In many cases, it is desirable to find a path that has the lowest cost (e.g., shortest path). For example, the shortest path from node A to node G may proceed in the sequence A-B-C-F-G, having a total cost of 4+2+2+5=13. It may be noted that the other possible paths from node A to node G incur a higher cost.

The path computation graph 20 provides a graphical representation of the network where each node A, B, C, D, E, F, G is defined as a vertex (Vx) and each interconnection between the nodes is defined as a link (Lx) with an associated administrative weight. Thus, the path computation graph 20 may be represented mathematically as G={Vx, Lx}. In the digital domain, the control plane may use the Dijkstra algorithm G{Vx, Lx} for computing a shortest path through the network. However, in the photonic domain, several restrictions occur which may lead to an incorrect or invalid result from the Dijkstra algorithm G{Vx, Lx}. The Dijkstra algorithm approach focuses on computation of a path in a single network layer. The Dijkstra algorithm finds a single pass through a node. If the same node is visited again, the algorithm considers this path invalid.

In various embodiments, the path computation systems and methods in mixed photonic and digital mesh networks add additional constraints which are considered herein. These additional constraints may include wavelength capability, add/drop/express capability of a wavelength at each node, wavelength availability, availability of each wavelength in both directions at each node, nodal connectivity constraints, ability to connect a wavelength through each node, etc.

Figure 3:
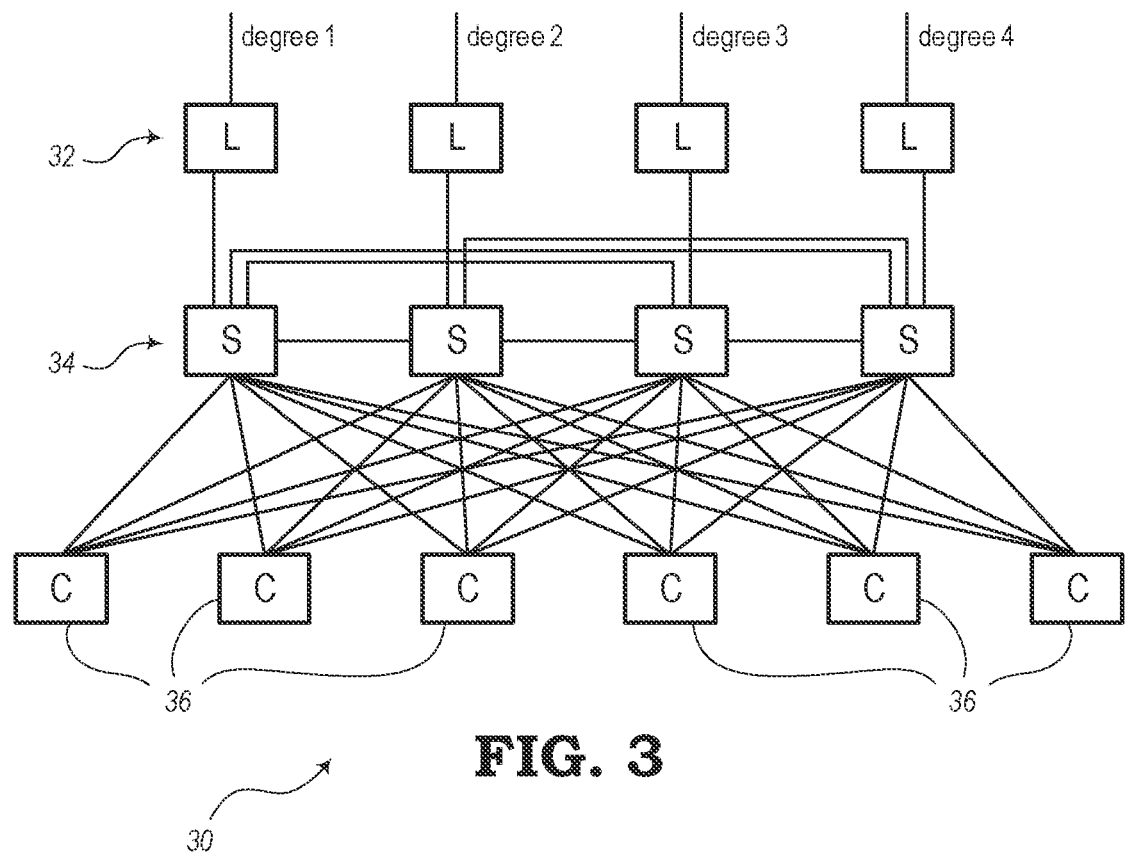
FIG. 3 is a block diagram illustrating an optical node having a plurality of interconnected internal optical components, according to various embodiments of the present disclosure.

FIG. 3 is a block diagram illustrating an embodiment of an optical node 30 (or site) having a plurality of interconnected internal optical components. In this embodiment, for example, the optical node 30 may represent a four-degree node (e.g., node C or node F shown in FIG. 2). The internal components of the optical node 30 include Line (L) components 32 (e.g., line multiplexer/demultiplexer devices), where each L component 32 is arranged at the edge or degree of the optical node 30 for connection with neighboring nodes. The internal components of the optical node 30 further include Section (S) components 34 (e.g., section multiplexer/demultiplexer devices) and Channel (C) components 36 (e.g., channel multiplexer/demultiplexer devices). Each C component 36 may be connected to each of the S components 34 (e.g., in a full mesh configuration) and each of the S components 34 may be connected to the other S components 34. The L components 32 are connected at one end to an S component 34 and at the other end to a different node or site. With respect to routing, the L components 32 may be grouped with their corresponding S components 34 in order that each pair can be considered as a single S node. The optical node 30 may be implemented as a Reconfigurable Optical Add/Drop Multiplexer (ROADM) in a reconfigurable optical line system. The L, S, and C components 32, 34, 36 may each be configured as Photonic Functional Group (PFG) components at the optical node 30.

One of the challenges of using a k Shortest Path First (k-SPF) routing algorithm in a DWDM network is that the links of an optical component (node) are not equal, and hence not all link-pairs are optically valid in a path. For instance, all channels going through a Wavelength Selective Switch (WSS) must pass through a common in/out link. As such, paths that enter a switch in/out port cannot leave the node by another switch in/out link. Rather than maintaining a set of valid link-pairs per device type, the embodiments of the present disclosure are configured to filter out invalid paths. More particularly, this filtering process may include determining when a path is based on an invalid sequence of node types through which optical signals would not be able to pass or would be impractical.

Figure 4:
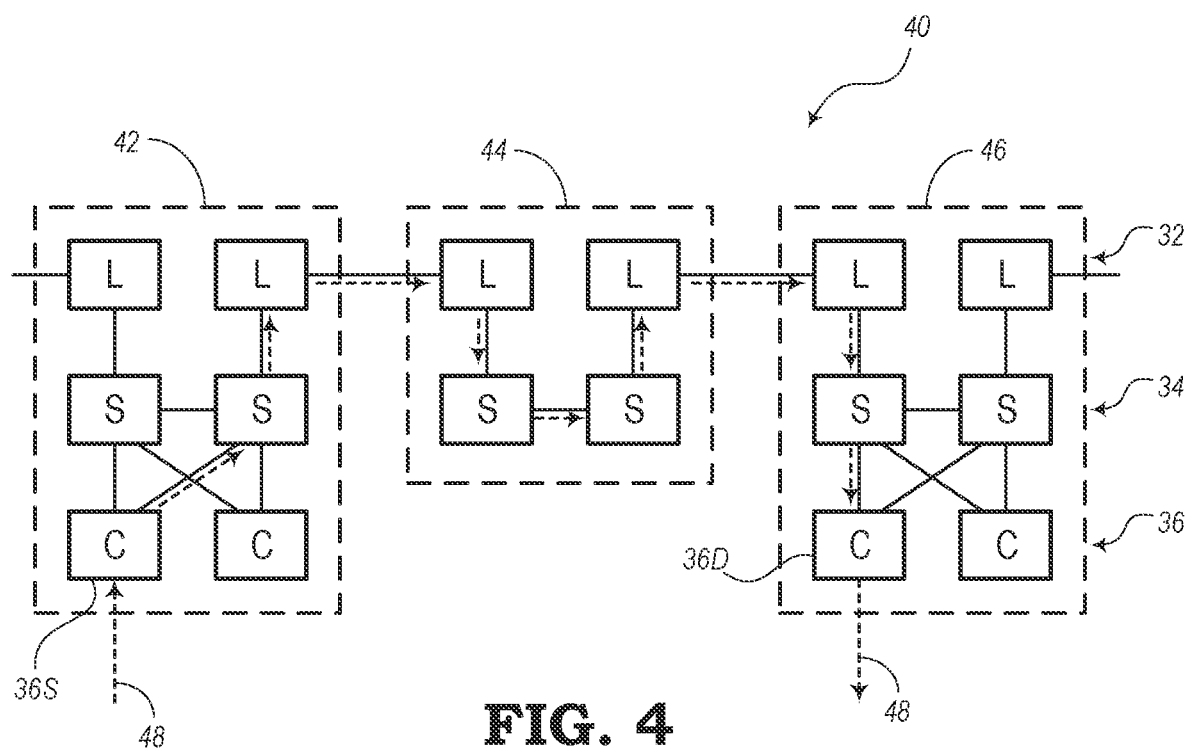
FIG. 4 is a block diagram illustrating a portion of an optical network having a plurality of nodes each including multiple internal optical components, according to various embodiments of the present disclosure.

FIG. 4 is a block diagram illustrating a portion of an optical network 40 having a plurality of nodes 42, 44, 46, each including multiple internal optical components (i.e., L components 32, S components 34, and C components 36). Based on various photonic constraints of the optical network 40 (or other optical networks), certain sequences of certain types of components (e.g., L, S, and C components) are unviable or invalid. As all ports are not equal, the only valid sequences of the PFGs (e.g., L, S, and C components 32, 34, 36) at a site are:

C-S-L
L-S-C
L-S-S-L

Other sequences would not be valid. As mentioned above, the L components 32 may be grouped with their corresponding S components 34 in order that each pair can be considered as a single S node. In this respect, the valid sequences would include C-S, S-C, and S-S.

One potential implementation may include running k-SPF and only using paths that contain the above-noted valid sequences. However, this may not be the most efficient strategy since only a small proportion of the total paths may actually be valid. For instance, according to one example including a small five-site (or five-node) network, the L, S, and C components 32, 34, 36 may be arranged where there would only be five valid paths out of 255 possible paths.

Therefore, according to another implementation, the systems and methods of the present disclosure may be configured to utilize path computation where partial paths are analyzed and filtered out while path computation (e.g., Dijkstra or other suitable algorithm) is currently running, where the partial paths are filtered out by looking back at previously walked partial paths to see if any of these partial paths include one of the invalid sequences of the L, S, and C components 32, 34, 36 mentioned below. Each of the following invalid sequences include a specific order of certain types of components (i.e., L, S, or C), where each sequence (according to this embodiment) includes two hops. The first hop is from a first component to the second component and the second hop is from the second component to the third component.

1) A first invalid sequence may be represented as an S-S-S sequence. Since each S component is connected to the other S components 34 (e.g., as depicted in FIG. 3), there is no need to hop from a first S component to a second S component and then hop from that second S component to a third S component. To optimize paths, two S components may be used in a sequence, but then it would be more efficient at this time to leave on an L component 32.

2) A second invalid sequence may be represented as an C-S-S sequence (when a full-mesh configuration is implemented). Since the C components 36 and S components 34 may be configured in a full-mesh arrangement, when a first hop proceed from a C component 36 to an S component, it would be more efficient to leave by an L component 32 corresponding to the S component 34. As mentioned above, there would be no need to proceed to another S component at this time.

3) A third invalid sequence may be represented as an S-S-C sequence. This sequence is similar to the second sequence in the scenario where the S components and C components are arranged in a full-mesh configuration. Again, since the S component may proceed to a specific C component, it would be inefficient to proceed first to another S component before going to the C component.

4) A fourth invalid sequence may be represented as a C-S-C sequence. In an optical network, it is unviable to enter a switch port without leaving the switch port via a line port.

5) A fifth invalid sequence may be represented as a S-C-S sequence. This sequence in an optical network is also unviable since a channel would need to drop once the optical signal enters a channel demultiplexer.

Therefore, according to a topology in which L, S, and C components 32, 34, 36 are arranged as shown in FIGS. 3 and 4 with the S and C components 34, 36 arranged in a full-mesh configuration, the above-noted five "rules" (e.g., also referred to as "elimination rules") may be checked in a photonic network to determine if certain partial paths should be eliminated. Based on these five rules, any three component sequence (over the past two hops) can be analyzed to determine if the sequence includes one of the five invalid sequences. If so, this path can be eliminated from consideration, such as by removing the path from a priority queue. Also, any other paths that include this partial path (having one of the same invalid sequences) are viewed as also following one of the five elimination rules (i.e., having the invalid sequence) and can also be removed from further consideration. The five rules may be generalized for other constraints in other types of networks.

With the example of the network 40 shown in FIG. 4, the path computation systems and methods of the present disclosure may be configured to run the k-SPF algorithm (or other suitable path computation algorithm) for finding routes from a source 36S (e.g., one of the C components 36 of node 42) to a destination 36D (e.g., one of the C components 36 of node 46). For example, path 38 shows one route from the source 36S on the first node 42 to the destination 36D on the second node 46. At a step where the partial path to an intermediate node (i.e., node 44) is inserted into the priority queue, the partial path is checked to see if the last components match one of the five invalid sequences. If so, this path is not inserted into the priority queue. The strategy of eliminating (or not including) an invalid path during runtime is a convenient and efficient process, as there is only one list to check, regardless of the node type. Also, this strategy keeps the priority queue as small as possible, while dropping invalid paths early in the path computation process.

Therefore, the path computation according to various embodiments of the present disclosure may include various steps. A first step may include obtaining topology and components of a network (e.g., networks 10, 40) and making a path computation graph (e.g., path computation graph 20) used for assisting with the path computation processes. The graph may include "edges" (e.g., components L, S, C, or other hardware devices) and "links" (e.g., inter-node links and/or connectivity paths within the nodes) between the edges.

A second step may include obtaining a predefined set of rules for path constraints. For example, one rule may define that it is invalid to include a sequence from a channel device (i.e., C component 36) to a section device (i.e., S component 34) to another section device (i.e., another S component 34), such as is defined in the second invalid sequence C-S-S described above. These rules may be obtained from a network operator or from an automatic topology analysis process for determining unviable paths in a network. The rules may then be utilized to check the sequence of components in any previous consecutive two-hop partial path (e.g., the immediate previous two hops) to determine if any one of the five elimination rules apply to this two-hop partial path. Again, the rules may correspond to the five invalid two-hop sequences mentioned above and/or may include other rules that may pertain to other types of optical/photonic network or other types of networks having other sets of constraints.

After obtaining the topology and creating a graph and after establishing elimination rules regarding constraints for the particular network in which path computation is being analyzed, the processes of the present disclosure may further include filtering out invalid paths as the path computation "walks" through the graph. This filtering out step may include removing a path from consideration so that the path no longer needs to be deliberated. The invalid path can simply not be added to a priority heap as normally used in path computation algorithms. The elimination process includes looking back at the last three hardware components (i.e., the last two hops) in the sequence (or any previous partial path of three consecutive components) and see if the sequence matches one of the five rules mentioned above (or other established set of elimination rules). Then, the present path computation will not need to consider this path or any paths having this sequence. In some embodiments, the path computation of the present disclosure may be implemented via a control plane (e.g., source node, PCE, NMS, etc.).

Thus, the processes described herein are novel compared with the conventional Dijkstra algorithm. For example, when running k-SPF or other path computation processes, before partial paths are added to the priority queue, the present embodiments are configured to discard any paths whose last n "edges" (e.g., three hardware components) match one of a predetermined number of invalid sequences of specific edge types. Also, instead of merely analyzing paths from one node to another, the path computation described in the present disclosure are configured to treat the individual internal components of a node (e.g., network elements 12 shown in FIG. 1, nodes A, B, C, D, E, F, G shown in FIG. 2, optical node 30 of FIG. 3, and/or nodes 42, 44, 46 shown in FIG. 4) as an edge in a path computation graph. Thus, this process provides more granularity and resiliency to hardware faults in a network.

Some k-SPF algorithms include known methods for finding k-shortest paths from a source node to a destination node with a priority queue as a data structure to store and query ready/partial paths keeping the computation time to $O(|E|+|V|\log |V|)$. Typically, link-pair problems may be solved by constraining what egress ports to consider, as a function of the node type and ingress port. The embodiments of the present disclosure include a process for maintaining a table per node type, where each table includes a list of valid port combinations.

In one example, let a graph $G=(V, E)$ with a node set $V$ and a link set $E$. During k-SPF, at any time, $L$ is an ordered list of node-link pairs (or partial paths) described as:
$L=\{(v_i, e_i)|v_i \in V, e_i \in E\}$ $i \in S, \ldots, N$, where $S$ is a source node link pair and $N$ is an intermediate node link pair
and
$P=\{T|T=\{(v_i, e_i)\}|v_i \in V, e_i \in E\}$, where $P$ is a list of coloring patterns that are omitted from path-computation. During computation, a partial-path is omitted from computation if it follows any pattern covered by $P$. The process rejects $L_i$ if there exists $L \in P$, when $L_i \approx nL$, defining equivalence relation $\approx N$ by saying that $L_1 \approx nL_2$ if the last $N$ elements of $L_1$ and $L_2$ are equal.

Figure 5:
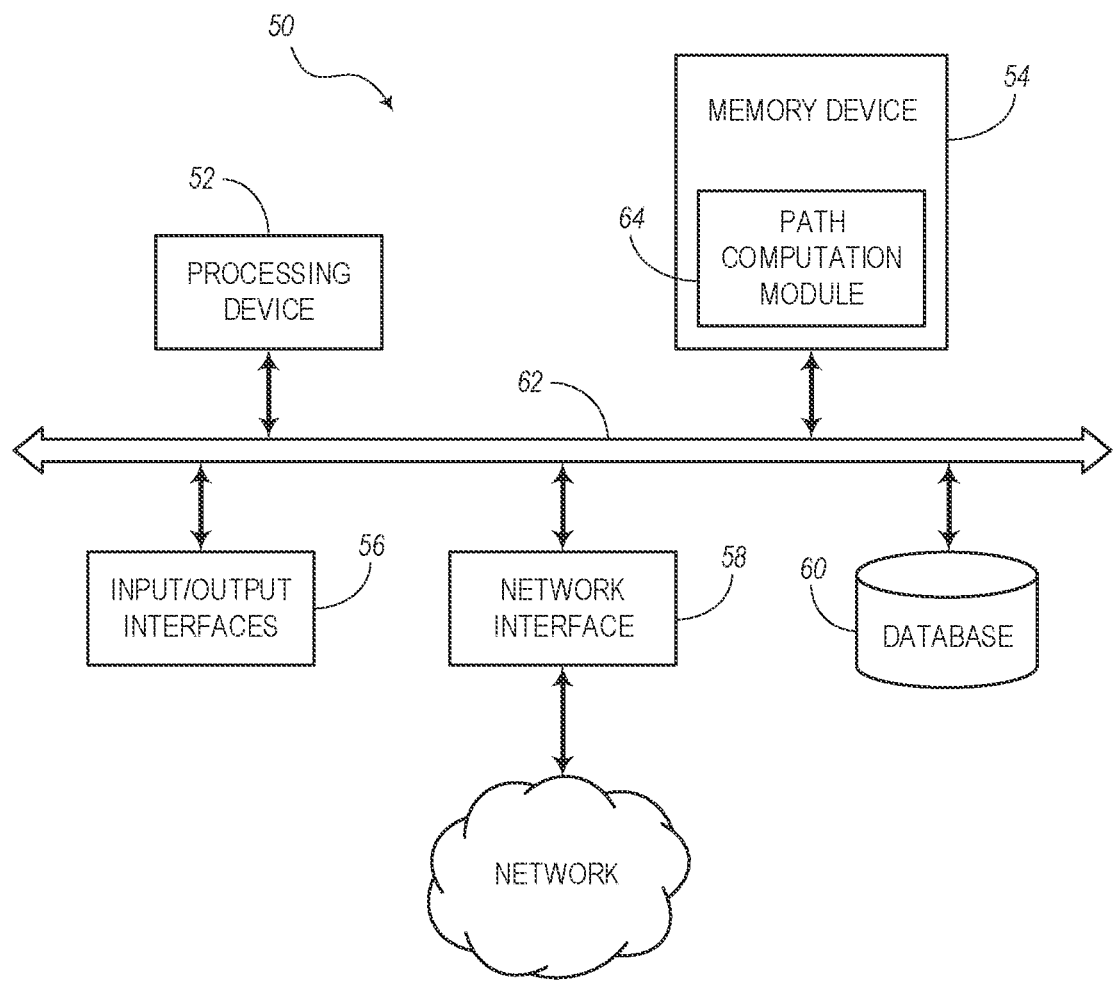
FIG. 5 is a block diagram illustrating a computing system for performing path computation for an optical network, according to various embodiments of the present disclosure.

FIG. 5 is a block diagram illustrating an embodiment of a computing system 50 for performing path computation for at least a portion of an optical network (e.g., network 10, 20, 30, 40). In this embodiment, the computing system 50 may be a digital computer that, in terms of hardware architecture, generally includes a processing device 52, a memory device 54, Input/Output (I/O) interfaces 56, a network interface 58, and a database 60. The memory device 54 may include a data store, database (e.g., database 60), or the like. It should be appreciated by those of ordinary skill in the art that FIG. 5 depicts the computing system 50 in a simplified manner, where practical embodiments may include additional components and suitably configured processing logic to support known or conventional operating features that are not described in detail herein. The components (i.e., 52, 54, 56, 58, 60) are communicatively coupled via a local interface 62. The local interface 62 may be, for example, but not limited to, one or more buses or other wired or wireless connections. The local interface 62 may have additional elements, which are omitted for simplicity, such as controllers, buffers, caches, drivers, repeaters, receivers, among other elements, to enable communications. Further, the local interface 62 may include address, control, and/or data connections to enable appropriate communications among the components 52, 54, 56, 58, 60.

The processing device 52 is a hardware device adapted for at least executing software instructions. The processing device 52 may be any custom made or commercially available processor, a Central Processing Unit (CPU), an auxiliary processor among several processors associated with the computing system 50, a semiconductor-based microprocessor (in the form of a microchip or chip set), or generally any device for executing software instructions. When the computing system 50 is in operation, the processing device 52 may be configured to execute software stored within the memory device 54, to communicate data to and from the memory device 54, and to generally control operations of the computing system 50 pursuant to the software instructions.

It will be appreciated that some embodiments of the processing device 52 described herein may include one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), and the like). The processing device 52 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 56 may be used to receive user input from and/or for providing system output to one or more devices or components. User input may be provided via, for example, a keyboard, touchpad, a mouse, and/or other input receiving devices. The system output may be provided via a display device, monitor, Graphical User Interface (GUI), a printer, and/or other user output devices. I/O interfaces 56 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an Infra-Red (IR) interface, a Radio Frequency (RF) interface, and a Universal Serial Bus (USB) interface.

The network interface 58 may be used to enable the computing system 50 to communicate over a network, such as the network 10, 20, 30, 40, the Internet, a Wide Area Network (WAN), a Local Area Network (LAN), and the like. The network interface 58 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 58 may include address, control, and/or data connections to enable appropriate communications on the network 10, 20, 30, 40.

The memory device 54 may include volatile memory elements (e.g., Random Access Memory (RAM)), such as Dynamic RAM (DRAM), Synchronous DRAM (SDRAM), Static RAM (SRAM), and the like, nonvolatile memory elements (e.g., Read Only Memory (ROM), hard drive, tape, Compact Disc ROM (CD-ROM), and the like), and combinations thereof. Moreover, the memory device 54 may incorporate electronic, magnetic, optical, and/or other types of storage media. The memory device 54 may have a distributed architecture, where various components are situated remotely from one another, but can be accessed by the processing device 52. The software in memory device 54 may include one or more software programs, each of which may include an ordered listing of executable instructions for implementing logical functions. The software in the memory device 54 may also include a suitable Operating System (O/S) and one or more computer programs. The O/S essentially controls the execution of other computer programs, and provides scheduling, input-output control, file and data management, memory management, and communication control and related services. The computer programs may be configured to implement the various processes, algorithms, methods, techniques, etc. described herein.

The memory device 54 may include a data store used to store data. In one example, the data store may be located internal to the computing system 50 and may include, for example, an internal hard drive connected to the local interface 62 in the computing system 50. Additionally, in another embodiment, the data store may be located external to the computing system 50 and may include, for example, an external hard drive connected to the Input/Output (I/O) interfaces 56 (e.g., SCSI or USB connection). In a further embodiment, the data store may be connected to the computing system 50 through a network and may include, for example, a network attached file server.

Moreover, some embodiments may include a non-transitory computer-readable storage medium having computer readable code stored in the memory device 54 for programming the computing system 50 or other processor-equipped computer, server, appliance, device, circuit, etc., to perform functions as described herein. Examples of such non-transitory computer-readable storage mediums include, but are not limited to, a hard disk, an optical storage device, a magnetic storage device, a Read Only Memory (ROM), a Programmable ROM (PROM), an Erasable PROM (EPROM), and Electrically Erasable PROM (EEPROM), Flash memory, and the like. When stored in the non-transitory computer-readable medium, software can include instructions executable by the processing device 52 that, in response to such execution, cause the processing device 52 to perform a set of operations, steps, methods, processes, algorithms, functions, techniques, etc. as described herein for the various embodiments.

Also, FIG. 5 may be configured with a path computation module 64. The path computation module 64 may be configured in hardware, software, firmware, or any combination thereof. As shown in FIG. 5, path computation module 64 may be implemented in software and stored in the memory device 54 and may enable the processing device 52 to perform certain functions associated with the module. For example, the path computation module 64 may include logic that causes the processing device 52 to compute paths through a network according to certain predefined goals (e.g., shortest path, lowest cost, etc.). Also, the path computation module 64 is configured to look for certain predetermined invalid path sequences, such as a sequence of internal components representing two previous hops. If a path is found to follow one of the invalid sequences (e.g., represented by the five rules described above), then this path is eliminated from further consideration.

Figure 6:
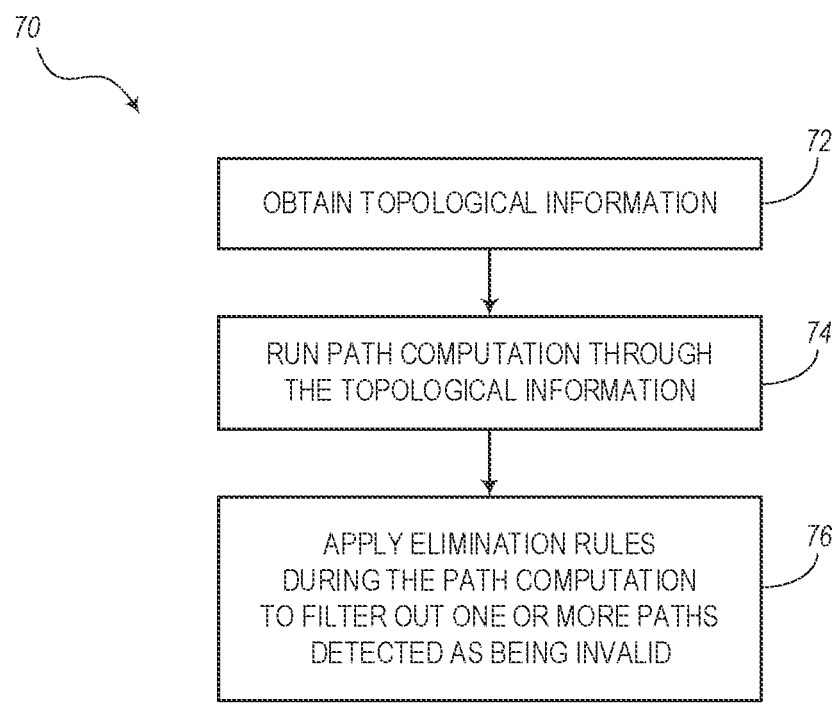
FIG. 6 is a diagram illustrating a path computation method, according to various embodiments of the present disclosure.

FIG. 6 is a diagram illustrating an embodiment of a process 70 for performing path computation. The process 70 may include a first step obtaining topological information, as indicated in block 72. The topological information may represent a topology of at least a portion of a network (e.g., network 10, 20, 30, 40), where the topological information includes one or more nodes and one or more links. Each link is configured to connect one of the one or more nodes with a neighboring node. Each node includes a plurality of internal components and a plurality of connections configured to interconnect the internal components. The process 70 further includes running path computation, as indicated in block 74. The path computation is run through the topological information to determine a plurality of paths from a first internal component to a second internal component. The process 70 also includes the step of applying elimination rules during the path computation to filter out one or more paths detected as being invalid, as indicated in block 76. The elimination rules may be based on one or more predetermined path sequences that include at least two hops involving an unviable sequence of specific types of internal components.

According to some embodiments, the process 70 may be implemented by the path computation module 64 of the computing system 50 of FIG. 5. The network in these embodiments may be an optical network, where the internal components may be optical components. For example, the optical components may include a line mux/demux device (L) at each degree of the respective node, a section mux/demux device (S) connected to each of the respective line mux/demux devices, and a plurality of channel mux/demux devices (C) connected to the section mux/demux devices. The elimination rules may include detected invalid sequences of being any of the following five sequences: 1) S-S-S, 2) C-S-S, 3) S-S-C, 4) C-S-C, and 5) S-C-S. After filtering out the one or more paths detected as being invalid, the remaining paths may include only the three valid sequences of 1) C-S-L, 2) L-S-C, and 3) L-S-S-L. The section mux/demux devices may be connected to the channel mux/demux devices in a full mesh configuration.

The process 70 may further be configured as follows. The process 70 may include the step of creating a graph from the topological information, where the graph may be configured to assist with path computation. A path is detected as being invalid if it follows one of the elimination rules, wherein each of the plurality of paths from the first internal component, represented as a source vertex, to the second internal component, represented as destination vertex, passes through one or more additional internal components. The step of filtering out one or more paths detected as being invalid may further include filtering out one or more additional paths as being invalid when the one or more additional paths are based on a partial path having the same predetermined invalid path sequence. Also, the step of filtering out one or more paths detected as being invalid may include the step of removing the invalid paths from a tentative list or priority queue. In some embodiments, the first internal component and the second internal component may be part of the same node.

With path computation, a process may include building a graph to show paths from source to destination. With some networks, there may be a lot of flexibility in how signals can be propagated along various paths. However, with an optical network, light can only travel in one direction, so there are usually more constraints in this regard. One of novel aspects of the present disclosure is that the process 70 of FIG. 6, and other related path computation processes which may be contemplated in light of the spirit and scope of the present disclosure, is configured to filter out the invalid or irrelevant paths in order to perform path computation as efficiently as possible. The present embodiments can take the photonic constraints and deal with them up front, so that when path computation continues, the systems only work with the remaining valid paths.

The photonic constraints can be classified in different ways. First, the photonic interconnectivity within the shelf may be classified as not necessarily being complete. Second, even with full connectivity, if one link is chosen and then another without looking back, the sequence is not checked, but in the present disclosure, certain sequences are indeed checked. If a path follows a certain sequence, the path may be recognized as being optically unviable. This does not mean that the path does not exist, or that a link is down, or that there are connectivity failures. Instead, even when the connectivity issues are present and operating properly, if a certain sequence is considered that does not sum up properly in the optical domain, it would be improper to attempt to create a path that optically would not function or would not able to work properly.

For example, in the optical domain, it would not make sense to create a viable path through a ROADM site to another ROADM site and then to another ROADM site. This would not be practical since the spectrum would be blocked in this case. Another way to think about the constraints of an optical network is that a MUX is a device with a common input and multiple output ports. An optical signal path should come in through the common input and go out one of the switch ports. A valid path would not go in through a switch port and go out another switch port. However, with conventional path computation algorithms (e.g., Dijkstra), these constraints are not considered and all nodes, vertices, or internal components may be looked at as the same, when in fact they may include certain one-way restrictions.

Without specific rules (as mentioned above), the process of dealing with the internal components of a node can get complicated, especially since each piece of hardware has a different set of rules, such as viable ingress and egress ports. From a cost perspective, computing paths using Dijkstra begins with a long list of infinite cost ports, but each possible path would need to be considered. On the other hand, the present disclosure narrows down the number of valid paths significantly. If implemented for the internal components of an optical node, the Dijkstra algorithm might would go through every path without looking back. However, the present embodiments use a more efficient process of removing paths from consideration when the previous two hops, when checked, are determined to be an invalid sequence, instead of continuing to plow through a number of invalid paths only to find at the end of the lengthy process that many of those paths cannot be used anyway. Therefore, the present embodiments analyze a backward looking partial path and determine if the immediately preceding hops fit any of these five elimination rules mentioned above. If they do, the processes can simply discard them and do not put them in the priority queue.

After the invalid paths are filtered out, the path computation can continue (or begin) as it normally would. For example, the remaining valid paths in the list can be given to a k-SPF algorithm for determining a shortest path. Therefore, the first step may include filtering out all the invalid sequences. This may result in a reduction of about 250 paths in a five-node network down to much more reasonable number of 15 paths. From these 15 paths, the path computation may then find the best few paths with low cost values. The path computation module 64 may receive an input from an operator that it may be desired to obtain only about 20 routes that do not follow any of the invalid sequences (or the remaining routes which do follow the correct sequence).

In the example of initially having 250 possible paths, the present embodiments would not need to provide filters for all 250 paths. The process may include starting with a channel mux (e.g., C component 36S) and go to a first section (e.g., one S component 34) and then to a second section (e.g., another S component 34). This three-edge sequence (e.g., C-S-S) is observed in the present disclosure as an invalid sequence. Since this sequence might be part of about 30 other final paths (of the 250), the process can filter out all 30 right at the beginning. Once those paths are detected as invalid, any subsequent paths with those three same internal components in that sequence will not be considered again.

Running a variation of the Dijkstra algorithm, as modified by the various implementations described in the present disclosure, the paths are originally marked infinite. Then the costs are considered. As the process walks through the graph, the process proceeds with temporary sub-paths, which are kept in a tentative list (or priority heap). However, before these temporary sub-paths are added to the priority heap, the present processes look back at the sequence of components involved in the last two hops. If the sequence is one of: 1) S-S-S; 2) C-S-S; 3) S-S-C; 4) C-S-C; or 5) S-C-S, then this partial path or temporary sub-path is determined to be inviable. The inviable paths are removed and any paths that start the same way are also removed, which may eliminate dozens of possible invalid paths. The process continues to walk through the graph and remove routes that do not comply with the rules (or follow an invalid sequence). Those invalid partial paths may never make it into the tentative list.

The process may include building the graph as it progresses while avoiding links that fall into those five elimination groups. Although the topology may not be known up front, when the present processes create a graph from the obtain topological information, the prior two hops can reveal a sequence that follows one of the combinations that does not make sense from a photonic point of view.

The present algorithms may be executed on each individual network element for determining unviable paths between the internal components of the network elements. While walking through the graph and finding invalid paths, the processes do not discard the paths at the end of the entire procedure, but instead discards the invalid paths as soon as they are found so that the process does not build additional routes based on those invalid sequences.

Conventional path computation processes were not interested in what was going on inside each node. Instead, it just looked at the edges or degrees, where each edge was either going down or going out. However, the embodiments of the present disclosure provide path computation having more granularity for analyzing the internal components of the nodes themselves. The present models also help with more resiliency, such as if something happens between the hardware, whereas a failure between two hardware components in the conventional systems is simply seen as a failure of the entire node.

The internal components inside each node may be added for scale as needed in a network. There may be a line component (L) and a section (S) for every ROADM degree. In some cases, a node (or network element) may have up to 60 ROADM degrees, with 60 L components and 60 S components. Also, there may be a channel mux for every 60 drop ports for hooking up 60 modems with complete meshing between the section (S) and channel (C) muxes. In other embodiments, there may be a partial mesh between S and C, which may result in a change in the elimination rules described above. Since some of those links would not exist in a partial mesh configuration, it may be easier to avoid certain sequence rules.

The present disclosure deals with how a model or algorithm may be created for path computation in a network. Even though the processes may operate in a control-plane-wise or graph-wise environment, where there may be no connectivity issues, but if certain partial segments of the paths were chosen, it may be determined that these partial paths may not work on the data plane. It might be able to work as a control-plane device, but not as a data-plane device in an optical environment. Although this may be applied in a Layer 0 environment, it should be recognized that the present embodiments may also be applied in a more generic fashion to any types of networks.

In an electrical system, it may be possible to come in or go out any port, but in a photonic system, this may not be the case. In electrical systems, path computation deals with connectivity and partial connectivity of individual vertices. In the present application, even if components are connected, they may not be viable, according to various elimination rules regarding sequences of certain types of components (e.g., L, S, C). In the present disclosure, every node may have its own table of valid linked pairs, which may an aspect that can be avoided by the processes described herein. Thus, with the five basic rules, it is possible to provide a fast computational process that can work with any optical network (or with any network having appropriate modification to handle other generic invalid sequences that may apply to each network in specific ways).

For the purpose of speed, some conventional implementations of k-SPF may employ a priority queue for partial paths. The filtering steps employed in the embodiments of the present disclosure may be applied to a partial path procedure just prior to adding it to the priority queue, keeping the size of the queue as small as possible. Thus, path computation in the present disclosure may involve looking back at the last number of hops and seeing if one of the invalid sequences has been followed. At this point, in the middle of path computation, this path can be abandoned or removed from any priority queue or may be configured to not allow this path to be put in the priority queue in the first place.

The path computation described herein may be incorporated in any control plane computing device for running on any network. This may be included in a product that computes paths, such as a Shortest Path First (SPF) computation device. The product may operate in any environment (e.g., in the networks or nodes 10, 20, 30, 40) where there are constraints on the validity of specific node sequences. It should be recognized that the path computation described herein are not meant to be limiting, but may include other solutions to the problem of finding desired paths (based on any suitable criteria), even those that may appear to be less efficient.

One benefit to the construction of reconfigurable optical line systems (e.g., ROADMs) is the speed at which it the embodiments of the present disclosure can restore photonic channels after a fault. Instead of relying completely on node-to-node types of recovery processes, the systems and methods of the present disclosure may be configured to reduce the time needed to validate protection paths on demand when a failure (e.g., fiber cut) occurs. For example, in a five-node network, the number of routes computed may be reduced by the present methods down from 220 to about 15. This may represent a time and storage saving of more than 93%. Fewer routes (only the valid routes) results in proportionally less computation time and much reduced restoration times as applications only need to traverse valid routes.

Figure 7A:
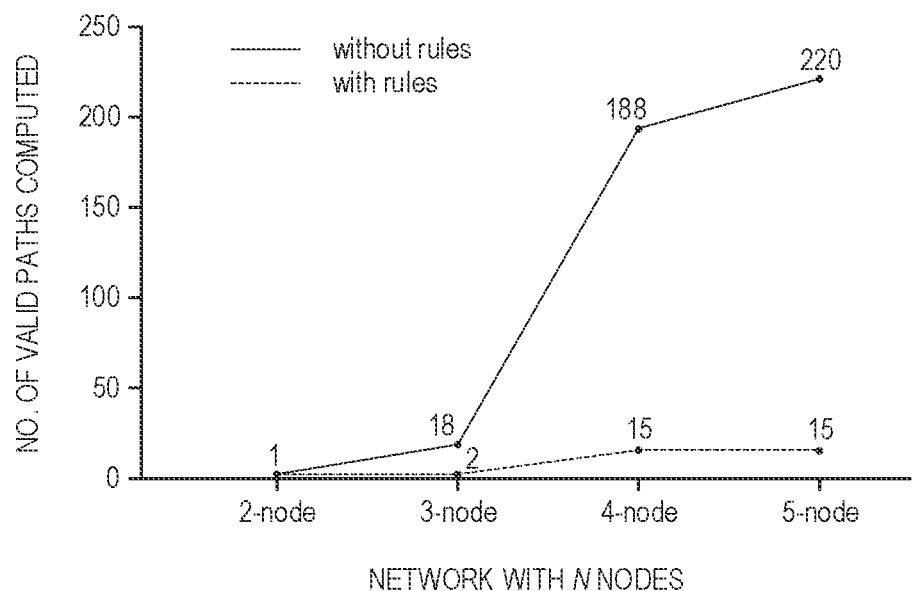
FIGS. 7a and 7b are graphs highlighting the advantages of utilizing the path computation method of FIG. 6.
Figure 7B:
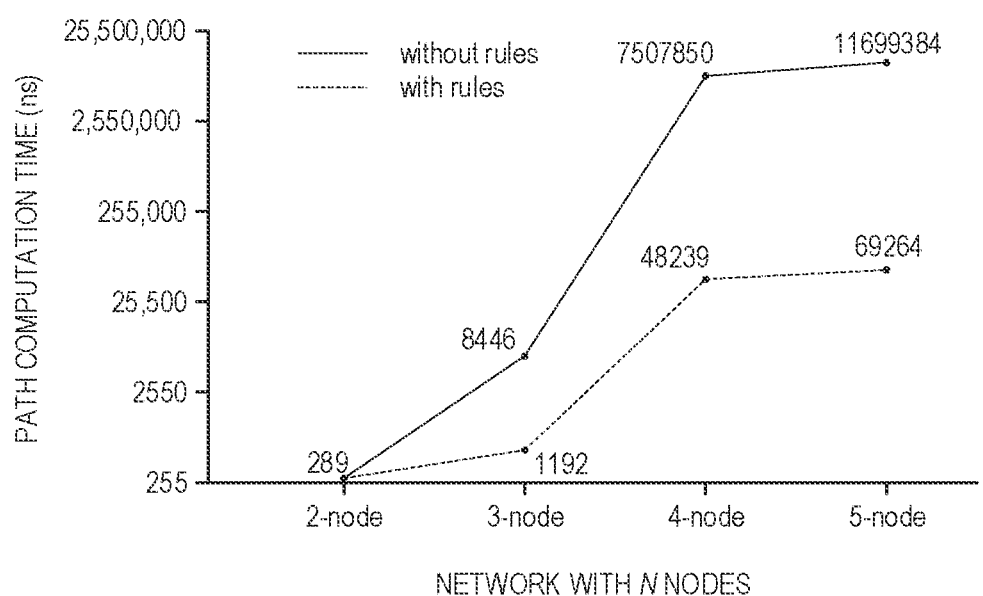

FIGS. 7*a* and 7*b* are graphs highlighting the advantages of utilizing the path computation method of FIG. 6. FIG. 7*a* shows the number of valid paths computed versus networks with different numbers of nodes (i.e., 2 nodes, 3 nodes, 4 nodes, and 5 nodes), as an example. The graph of FIG. 7*a* shows the numbers of paths without the rules described in the present disclosure and the reduced number of paths needed when the rules described herein are checked. Similar reductions are also shown in FIG. 7*b*, where the path computation times (in ns) are shown versus networks with different numbers of nodes. The path computation times are shown both for conventional systems (where the rules of the present disclosure are not checked) and for the present systems and methods where the rules are checked and paths can be eliminated.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A system comprising:
   a network interface connected to a network;
   a processing device in communication with the network interface; and
   a memory device in communication with the processing device, the memory device configured to store a computer program having instructions that, when executed, enable the processing device to
   obtain topological information representing a topology of at least a portion of the network, the topological information including one or more nodes and one or more links, each link configured to connect one of the one or more nodes with a neighboring node, wherein each node includes a plurality of internal components and a plurality of connections configured to interconnect the plurality of internal components,
   run path computation through the topological information to determine a plurality of paths from a first internal component to a second internal component,
   apply elimination rules during the path computation to filter out one or more paths detected as being invalid, wherein the elimination rules are based on one or more predetermined path sequences that include at least two hops involving an unviable sequence of specific types of internal components, and
   analyze a partial path on which the elimination rules are applied to determine if the partial path is invalid by looking back at two previous consecutive hops.

2. The system of claim 1, wherein the network is an optical network, and wherein the internal components are optical components.

3. The system of claim 2, wherein the optical components include line mux/demux devices (L) each arranged at a degree of a respective node, section mux/demux devices (S) interconnected with each other and each (S) connected to a respective line mux/demux device (L), and channel mux/demux devices (C) connected to the section mux/demux devices (S).

4. The system of claim 3, wherein the elimination rules include unviable sequences of:
   a) S-S-S,
   b) C-S-S,
   c) S-S-C,
   d) C-S-C, and
   e) S-C-S.

5. The system of claim 4, wherein, after filtering out the one or more paths detected as being invalid, the instructions further enable the processing device to obtain remaining paths that include valid sequences of:
   a) C-S-L,
   b) L-S-C, and
   c) L-S-S-L.

6. The system of claim 3, wherein the section mux/demux devices (S) are connected to the channel mux/demux devices (C) in a full-mesh configuration.

7. The system of claim 1, wherein the instructions further enable the processing device to create a graph from the topological information, the graph configured to assist with the path computation.

8. The system of claim 7, wherein the first internal component is represented as a source vertex in the graph and the second internal component is represented as a destination vertex in the graph, and wherein each of the plurality of paths from the source vertex to the destination vertex passes through one or more additional internal components.

9. The system of claim 1, wherein filtering out one or more paths detected as being invalid further includes filtering out one or more additional paths as being invalid when the one or more additional paths are based on a partial path having the one or more predetermined path sequences that include at least two hops involving an unviable sequence of specific types of internal components.

10. The system of claim 1, wherein filtering out the one or more paths detected as being invalid includes removing the one or more paths detected as being invalid from a tentative list or priority queue.

11. The system of claim 1, wherein the first internal component and the second internal component are arranged within a single node of the one or more nodes.

12. A non-transitory computer-readable medium configured to store computer logic having instructions that, when executed, cause one or more processing devices to
   obtain topological information representing a topology of at least a portion of a network, the topological information including one or more nodes and one or more links, each link configured to connect one of the one or more nodes with a neighboring node, wherein each node includes a plurality of internal components and a plurality of connections configured to interconnect the plurality of internal components,
   run path computation through the topological information to determine a plurality of paths from a first internal component to a second internal component,
   apply elimination rules during the path computation to filter out one or more paths detected as being invalid, wherein the elimination rules are based on one or more predetermined path sequences that include at least two hops involving an unviable, and
   analyze an partial path on which the elimination rules are applied to determine if the partial path is invalid by looking back at two previous consecutive hops.

13. The non-transitory computer-readable medium of claim 12, wherein the network is an optical network, and wherein the internal components include line mux/demux devices (L) each arranged at a degree of a respective node, section mux/demux devices (S) interconnected with each other and each (S) connected to a respective line mux/demux device (L), and channel mux/demux devices (C) connected to the section mux/demux devices (S).

14. The non-transitory computer-readable medium of claim 13, wherein the elimination rules include unviable sequences of:
   a) S-S-S,
   b) C-S-S, c) S-S-C,
d) C-S-C, and
e) S-C-S, and remaining paths that are left after filtering out the one or more paths detected as being invalid include valid sequences of:

a) C-S-L,
b) L-S-C, and
c) L-S-S-L.

15. A non-transitory computer-readable medium configured to store computer logic having instructions that, when executed, cause one or more processing devices to obtain topological information representing a topology of at least a portion of an optical network, the topological information including one or more nodes and one or more links, each link configured to connect one of the one or more nodes with a neighboring node, wherein each node includes a plurality of internal components that are optical components and a plurality of connections configured to interconnect the plurality of internal components, run path computation through the topological information to determine a plurality of paths from a first internal component to a second internal component, apply elimination rules during the path computation to filter out one or more paths detected as being invalid, wherein the elimination rules are based on one or more predetermined path sequences that include at least two hops involving an unviable sequence of specific types of internal components, wherein the optical components include line mux/demux devices (L) each arranged at a degree of a respective node, section mux/demux devices (S) interconnected with each other and each (S) connected to a respective line mux/demux device (L), and channel mux/demux devices (C) connected to the section mux/demux devices (S), and wherein the elimination rules include unviable sequences of:

a) S-S-S,
b) C-S-S,
c) S-S-C,
d) C-S-C, and
e) S-C-S.

16. The non-transitory computer-readable medium of claim 15, wherein, after filtering out the one or more paths detected as being invalid, the instructions further enable the processing device to obtain remaining paths that include valid sequences of:

a) C-S-L,
b) L-S-C, and
c) L-S-S-L.

17. The non-transitory computer-readable medium of claim 15, wherein the section mux/demux devices (S) are connected to the channel mux/demux devices (C) in a full-mesh configuration.

18. The non-transitory computer-readable medium of claim 15, wherein filtering out one or more paths detected as being invalid further includes filtering out one or more additional paths as being invalid when the one or more additional paths are based on a partial path having the one or more predetermined path sequences that include at least two hops involving an unviable sequence of specific types of internal components.

19. The non-transitory computer-readable medium of claim 15, wherein filtering out the one or more paths detected as being invalid includes removing the one or more paths detected as being invalid from a tentative list or priority queue.

20. The non-transitory computer-readable medium of claim 15, wherein the first internal component and the second internal component are arranged within a single node of the one or more nodes.

* * * * *